United States Patent
Abe et al.

(10) Patent No.: US 6,269,789 B1
(45) Date of Patent: Aug. 7, 2001

(54) DIRECT FUEL INJECTION-TYPE SPARK-IGNITION INTERNAL COMBUSTION ENGINE

(75) Inventors: Shizuo Abe, Aichi-ken; Fumikazu Satou; Kouichi Sasaki, both of Toyota; Sigemitu Iisaka, Shizuoka-ken, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/515,507

(22) Filed: Feb. 29, 2000

(30) Foreign Application Priority Data

Mar. 2, 1999 (JP) .................................................. 11-054238

(51) Int. Cl.$^7$ ....................................................... F02B 3/00
(52) U.S. Cl. ................................................................ 123/294
(58) Field of Search ..................................... 123/294, 295

(56) References Cited

U.S. PATENT DOCUMENTS 4,473,046 * 9/1984 Aoyama et al. ..................... 123/294
6,186,113 * 2/2001 Hattori et al. ....................... 123/305

FOREIGN PATENT DOCUMENTS 9-158736    6/1997  (JP) .

* cited by examiner

*Primary Examiner*—John Kwon
(74) *Attorney, Agent, or Firm*—Oliff & Berridge, PLC

(57) ABSTRACT

A direct fuel injection-type spark-ignition internal combustion engine is disclosed. The engine comprises a cavity formed on the top surface of the piston, a spark plug facing the inside of said cavity, and a fuel injection valve for injecting fuel into the cavity in nearly the shape of a fan having a relative small thickness. The cavity has a bottom wall onto which the injected fuel impinges initially and a side wall facing to the fuel injection valve. The side wall has a deflection portion which is nearly the shape of a linear line and a circular arc portion which connects the deflection portion and the bottom wall smoothly in a vertical section. An angle of the deflection portion with the bottom wall is in a range from 50 to 80 degrees. A radius of the circular arc portion is in a range from 5 to 15 mm.

16 Claims, 3 Drawing Sheets

DIRECT FUEL INJECTION-TYPE SPARK-IGNITION INTERNAL COMBUSTION ENGINE

BACKGROUND OF THE INVENTION

1. Field of the Invention

The present invention relates to a direct fuel injection-type spark-ignition internal combustion engine.

2. Description of the Related Art

There has heretofore been known stratified charge combustion produced by directly injecting fuel into a cylinder to form a mixture that can be favorably ignited (combustible mixture) only in the vicinity of a spark plug, at the ignition timing, to burn a lean mixture in the cylinder as a whole. To carry out the stratified charge combustion, in general, fuel is injected in the latter half of the compression stroke. It is intended that the thus injected fuel proceeds into a concave combustion chamber, is vaporized by robbing heat from the wall surfaces of the combustion chamber, is deflected by the shape of the combustion chamber toward the spark plug, and forms a combustible mixture near the spark plug.

Japanese Unexamined Patent Publication (Kokai) Mo. 9-158736 proposes injecting the fuel in the shape of a flat fan having a relatively small thickness by using a fuel injection valve having an injection hole in the shape of a slit. In comparison with general fuel spray having a cone shape, the thus injected fuel can rob heat from a wide area of the wall surfaces of the combustion chamber, making it possible to form a combustible mixture within a short period and to retard the timing for ending the injection of fuel. Thus, it is possible to increase an amount of injected fuel in the latter half of the compression stroke and to expand the region of stratified charge combustion toward the high engine load side.

After impinging the bottom wall of the combustion chamber, the fuel injected in a flat fan shape spreads in the width direction while progressing along the bottom wall of the combustion chamber. Therefore, the fuel can favorably vaporize by robbing heat from a wide area of the bottom wall. However, on the other hand, to form a mass of combustible mixture near the spark plug, each part of the fuel spreaded in the width direction must be directed near to the spark plug by the side wall facing the fuel injection valve in the combustion chamber. The side wall has a circular arc shape in plan view. Therefore, when the spread fuel moves up along the side wall of the combustion chamber after progressing along the bottom wall, each part of fuel is given a speed component upward and a speed component toward the center of the wide direction of the fuel spray. Thus, all of the fuel moves near to the spark plug arranged above the center of the width direction of the fuel spray and a mass of combustible mixture is formed in the vicinity of the spark plug.

In general, the spark plug is arranged above the center of the width direction of the fuel spray and inside of the side wall, i.e., above the circumference portion of the combustion chamber. Accordingly, to direct each part of the fuel to the vicinity of the spark plug, the side wall has a deflection portion inclined to the inside of the combustion chamber, and the deflection portion and the bottom wall of the combustion chamber are smoothly connected by a circular arc portion. The angle of the deflection portion with the bottom wall of the combustion chamber and a radius of the circular arc portion are important factors to surely direct each part of the fuel to the vicinity of the spark plug. If these are inappropriately selected, a mass of combustible mixture may not be formed in the vicinity of the spark plug and thus good stratified charge combustion may not be realized.

SUMMARY OF THE INVENTION

Accordingly, an object of the present invention is to provide a direct fuel injection-type spark-ignition internal combustion engine comprising a fuel injection valve which has a slit-like injection hole, and a concave cavity formed on the top surface of the piston, in which the fuel injected into the cavity is led near the spark plug by the side wall of the cavity facing the fuel injection valve, and which can realize good stratified charge combustion by a specified shape of the side wall of the cavity.

According to the present invention, there is provided a direct fuel injection-type spark-ignition internal combustion engine comprising a cavity formed on the top surface of the piston, a spark plug facing the inside of said cavity, and a fuel injection valve for injecting fuel into the cavity in nearly the shape of a fan having a relative small thickness, wherein the cavity having a bottom wall to which the injected fuel impinges initially and a side wall facing to the fuel injection valve, the side wall having a deflection portion which is nearly the shape of a linear line and a circular arc portion which connects the deflection portion and the bottom wall smoothly in a vertical section, an angle of the deflection portion with the bottom wall being in a range from 50 to 80 degrees, a radius of the circular arc portion being in a range from 5 to 15 mm.

The present invention will be more fully understood from the description of preferred embodiments of the invention set forth below, together with the accompanying drawings.

DESCRIPTION OF THE PREFERRED EMBODIMENT

Figure 1:
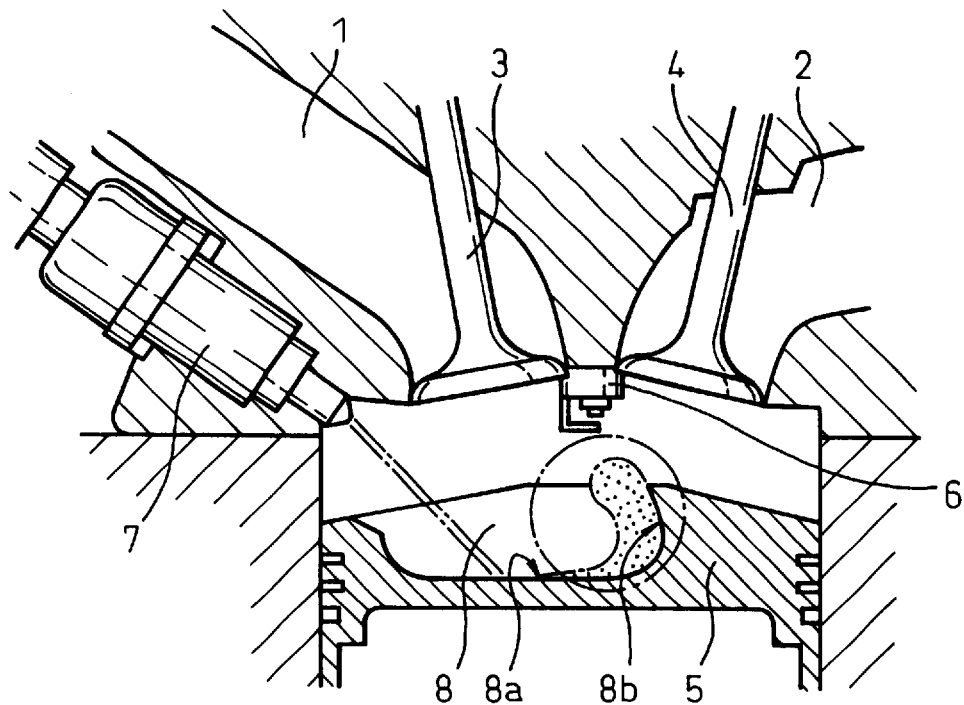
FIG. 1 is a vertical sectional view schematically illustrating a part of direct fuel injection-type spark-ignition internal combustion engine according to an embodiment of the present invention.
Figure 2:
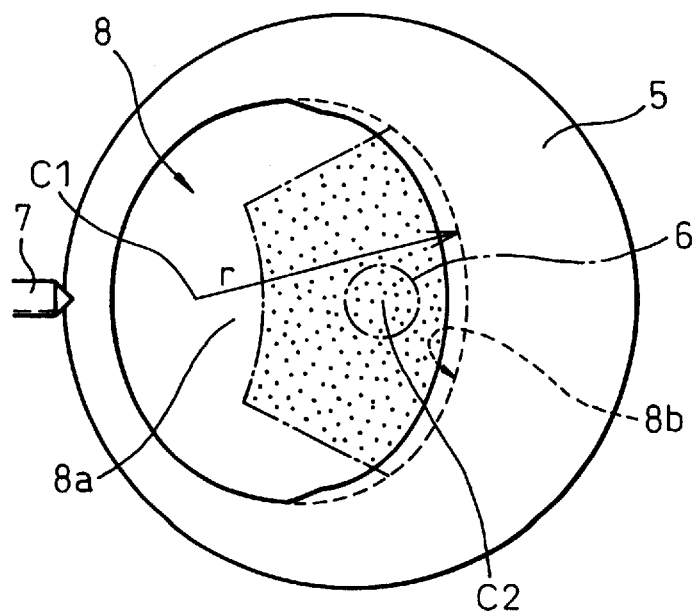
FIG. 2 is a plan view of a piston shown in FIG. 1.

FIG. 1 is a vertical sectional view schematically illustrating a part of direct fuel injection-type spark-ignition internal combustion engine according to an embodiment of the present invention. FIG. 2 is a plan view of a piston shown in FIG. 1. In these figures, reference numeral 1 denotes an intake port and 2 denotes an exhaust port. The intake port 1 is communicated with the cylinder via an intake valve 3, and the exhaust port 2 is communicated with the cylinder via an exhaust valve 4. Reference numeral 5 denotes a piston, and 6 denotes a spark plug arranged near the center of the upper wall of the cylinder. The fuel injection valve 7 is arranged on the intake port side in the upper portion of the cylinder, and injects fuel in a flat fan shape having a relatively small thickness.

For example, in a uniform charge combustion region where a high engine output is required, the fuel injection valve 7 injects a required amount of fuel in the intake stroke thereby to form a uniform charge mixture in the cylinder at the ignition timing. On the other hand, in a stratified charge combustion region, the fuel injection valve 7 injects a required amount of fuel in the latter half of the compression stroke. A concave cavity 8 is formed on the top surface of the piston 5. The cavity 8 has a bottom wall 8a and a side wall 8b facing the fuel injection valve 7 in the latter half of the compression stroke, and is off-set on the intake port side such that the spark plug 6, which is arranged near the center of the upper wall of the cylinder, faces the circumference portion of the cavity 8. As shown in FIG. 2, the center portion in height direction of the side wall 8b has a circular arc shape in a plan view. The radius (r) of the circular arc shape is approximately 40 mm. Furthermore, in a plan view, the center of the injection hole of the fuel injection valve 7, the center (C1) of the radius (r) of the circular arc shape, and the center (C2) of the spark plug 6 are almost aligned, and the distance between the center (C1) and the center (C2) in a plan view is approximately 25 mm.

As shown in FIG. 1, all of the fuel injected in the latter half of the compression stroke enters into the cavity 8 formed on the top surface of the piston 5, and collides with the bottom wall 8a of the cavity 8. Thereafter, the fuel proceeds toward the side wall 8b of the cavity 8 which faces the fuel injection valve 7 along the bottom wall 8a. Each port of the fuel is given a speed component upward and a speed component toward the center in the width direction of the fuel spray by the circular arc shape of the side wall 8b, in a plan view, and is deflected near to the spark plug 6.

Since the fuel injected by the fuel injection valve 7 has a flat fan shape with a relative small thickness, as shown in FIG. 2, the fuel progresses along the bottom wall 8a of the cavity 8 while spreading in the width direction. Therefore, the fuel can rob heat from a wide area of the bottom wall 8a. Although the fuel immediately after injection is liquid, all parts of the fuel in the width direction can vaporize quickly, and become a mass of a combustible mixture, having a concentration causing favorable ignition, by converging near to the spark plug 6. Thus, if the fuel is injected in a flat fan shape with a relative small thickness, the injected fuel can vaporize quickly. Therefore, the timing for ending the injection of fuel can be retard and a relative large amount of fuel can be injected. Here, if each part of the fuel can be converged near to the spark plug at the ignition timing, a good ignition is insured and the region of stratified charge combustion can be expanded toward the high engine load side.

Figure 3:
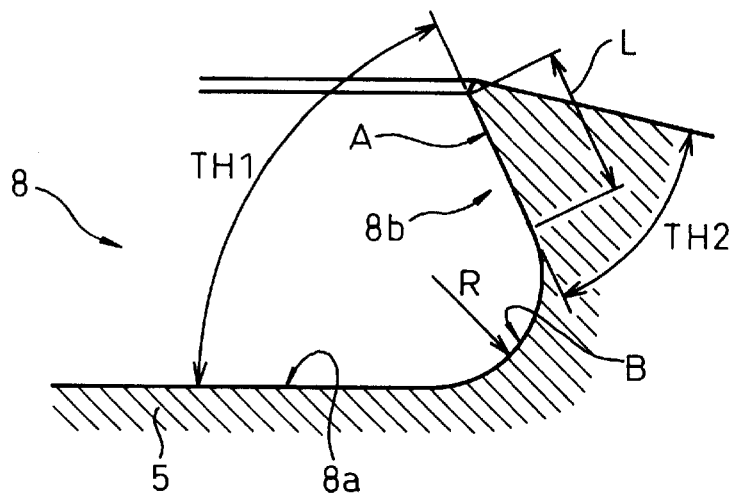
FIG. 3 is an enlarged vertical radial sectional view of the side wall facing the fuel injection valve of the cavity formed on the top surface of the piston.

In other words, even if the fuel is vaporized by using of the fan shape fuel spray, if each part of the fuel in the width direction is not converged near to the spark plug 6, good stratified charge combustion cannot be realized. FIG. 3 shows an enlarged vertical radial sectional view of the side wall 8b facing the fuel injection valve of the cavity 8 around the vertical line passing through the center (C1) of the circular arc shape, which has a circular arc shape in a plan view. As mentioned above, since the spark plug 6 is positioned to face the inside of the cavity 8, the side wall 8b of the cavity 8 has a deflection portion (A) inclined on the inside of the cavity 8 as shown in FIG. 3. Furthermore, the deflection portion (A) and the bottom wall 8a of the cavity 8 are smoothly connected by a circular arc portion (B) such that when the fuel transfers from the bottom wall 8a of the cavity 8 to the side wall 8b, the inertial energy of the fuel does not decrease greatly. To surely converge all of the fuel in the vicinity of the spark plug 6, the shape of the side wall 8b of the cavity 8 must be selected suitably.

In particular, it is important to set an angle (TH1) of the deflection portion (A) with the bottom wall Ba. If this angle is too large, it is difficult to converge all of the vaporized fuel in the vicinity of the spark plug 6. Therefore, the concentration of the mixture near the spark plug 6 becomes low and thus misfiring can occur. As mentioned above, the deflection portion (A) and the circular arc portion (B) are smoothly connected and, in a vertical section as shown in FIG. 3, the deflection portion (A) forms a tangent line of the circular arc portion (B). Therefore, if the angle (TH1) is too small, an included angle of the circular arc portion (B) around the center thereof approaches to 180 degrees and each part of the fuel, when it progresses along the circular arc portion (B), is given a vertical rotation force and rotates vertically. Therefore, all of the fuel does not progress along the deflection portion (A). Thus, after all, each part of the vaporized fuel does not converge in the vicinity of the spark plug 6 and misfiring can occur.

Figure 4:
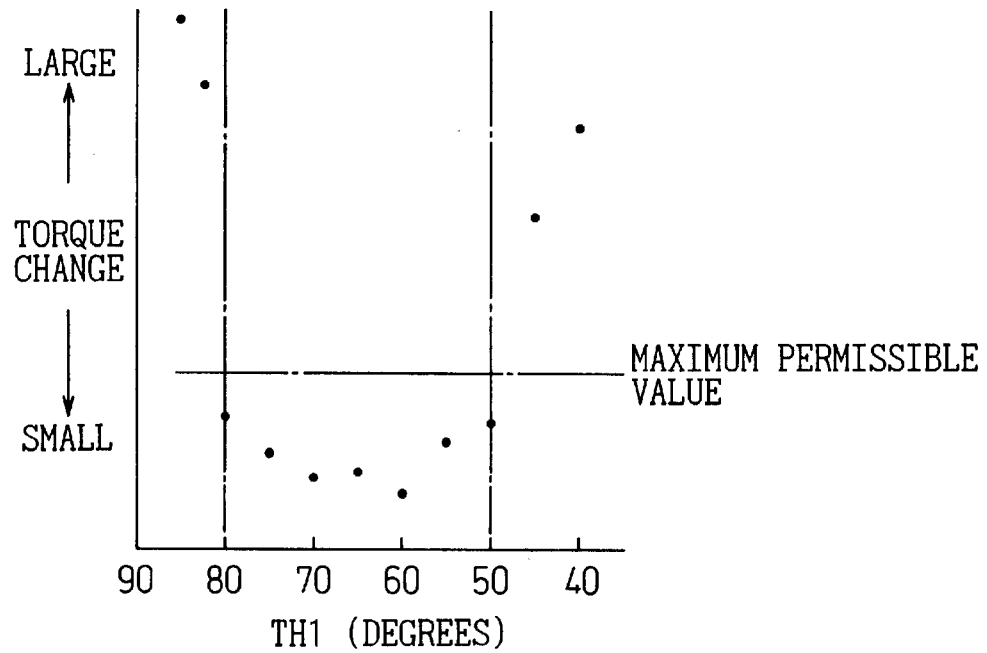
FIG. 4 is a result of experiments showing a relationship between an angle of the deflection portion on the side wall facing the fuel injection valve with the bottom wall and a torque change.

FIG. 4 is a result of experiments showing a relationship between an angle (TH1) of the deflection portion (A) on the side wall 8b of the cavity 8 with the bottom wall 8a and a torque change. In the experiments, a radius (R) of the circular arc portion (B) is fixed to 10 mm, a tip vertical angle (TH2) of the deflection portion (A) is fixed to 45 degrees, and a length (L) of the deflection portion (A) is fixed to 4 mm. When only the angle (TH1) is varied, a torque change is measured. Here, a torque change is defined as a difference between torques produced in two cylinders. Namely, the more the combustion becomes unstable, the larger the torque change is. As shown in FIG. 4, when an angle (TH1) is smaller than 50 degrees, a torque change becomes very large. Also when an angle (TH1) is larger than 80 degrees, a torque change becomes very large. Thus, the angle (TH1) of the deflection portion (A) on the side wall 8b of the cavity 8 with the bottom wall 8a must be a range from 50 to 80 degrees. Therefore, a torque change can be smaller than the maximum permissible value.

Figure 5:
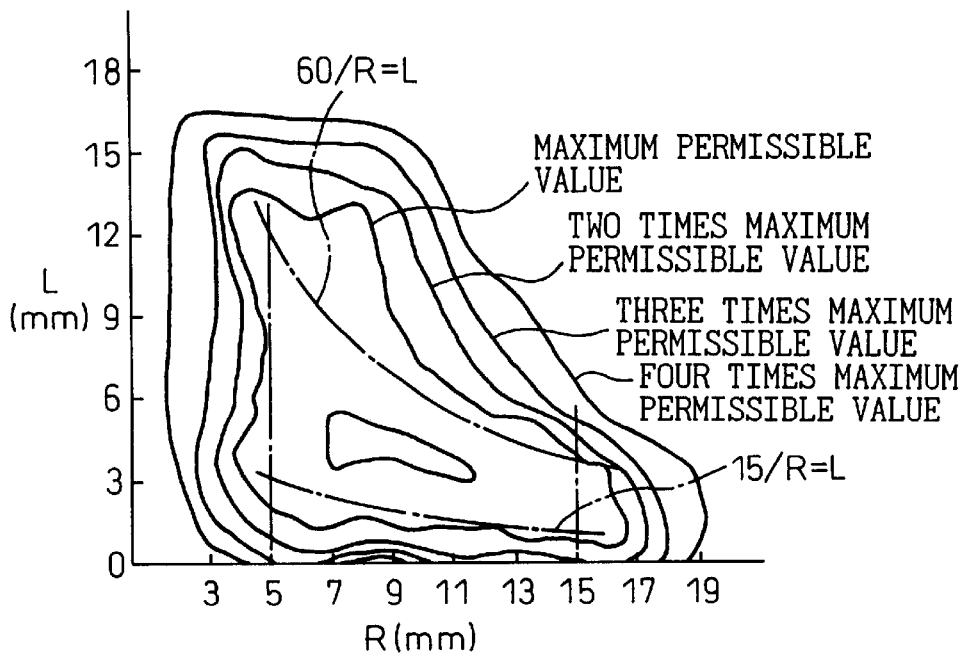
FIG. 5 is a result of experiments showing a relationship between a combination of a length of the deflection portion on the side wall facing the fuel injection valve and a radius of the circular arc portion, and a torque change.

FIG. 5 is a result of experiments showing a relationship between a combination of a length (L) of the deflection portion (A) on the side wall 8b of the cavity 8 and a radius (R) of the circular arc portion (B), and a torque change. In the experiments, an angle (TH1) of the deflection portion (A) with the bottom wall 8a is fixed to 65 degrees and a tip vertical angle (TH2) of the deflection portion (A) is fixed to 45 degrees.

As shown in FIG. 5, when a radius (R) of the circular arc portion (B) is smaller than 5 mm, a torque change becomes very large regardless of a length (L) of the deflection portion (A). This is due to the following. The radius (R) of the circular arc portion (B) is too small and thus the fuel is deflected suddenly while transferring from the bottom wall 8a of the cavity 8 to the side wall 8b. Therefore, the inertial energy of each part of the fuel drops greatly and thus all of the fuel does not reach in the vicinity of the spark plug 6 at the ignition timing.

When a radius (R) of the circular arc portion (B) is larger than 15 mm, a torque change becomes very large regardless of a length (L) of the deflection portion (A). This is due to the following. The radius (R) of the circular arc portion (B) is too large and thus the fuel is deflected gently while transferring from the bottom wall 8a of the cavity 8 to the side wall 8b. Therefore, the inertial energy of each part of the fuel drops little and thus each part of the fuel has already passed through the vicinity of the spark plug 6 at the ignition timing.

Thus, to realize good stratified charge combustion, in the side wall 8b of the cavity 8 facing the fuel injection valve, at least the angle (TH1) of the deflection portion (A) with the bottom wall 8a must be set between 50 and 80 degrees and the radius (R) of the circular arc portion (B) must be set between 5 and 15 mm.

Furthermore, if the volume of the cavity 8 is too large, the compression ratio drops and thus stratified charge combustion becomes unstable. On the other hand, the bottom wall 8a of the cavity 8 must have a relatively large area such that the fan shape fuel spray can spread sufficiently in the width direction. Accordingly, when a radius (R) of the circular arc portion (B) is set to nearly 15 mm, if a length (L) of the deflection portion (A) is too large, a depth of the cavity 8 also becomes large and a volume of the cavity 8 becomes too large. Thus, a compression ratio drops and a torque change becomes large. However, when a radius (R) of the circular arc portion (B) is set nearly 5 mm, even if a length (L) of the deflection portion (A) is made large to some degree, the volume of the cavity 8 does not become too large and thus a torque change can be maintained below the maximum permissible value.

In FIG. 5, curve lines of "60/R=L" and "15/R=L" are shown. It should be understood that if a relationship between a radius (R) of the circular arc portion (B) and a length (L) of the deflection portion (A) is "60/R<L", a torque change can become larger than the maximum permissible value, and if a relationship between a radius (R) of the circular arc portion (B) and a length (L) of the deflection portion (A) is "15/R>L", a torque change can become larger than the maximum permissible value. Thus, if the angle (TH1) of the deflection portion (A) with the bottom wall 8a is set between 50 and 80 degrees, if a radius (R) of the circular arc portion (B) is set between 5 and 15 mm, and if a relationship between a radius (R) of the circular arc portion (B) and a length (L) of the deflection portion (A) is "60/R>L>15/R", a torque change can surely be below the maximum permissible value.

Figure 6:
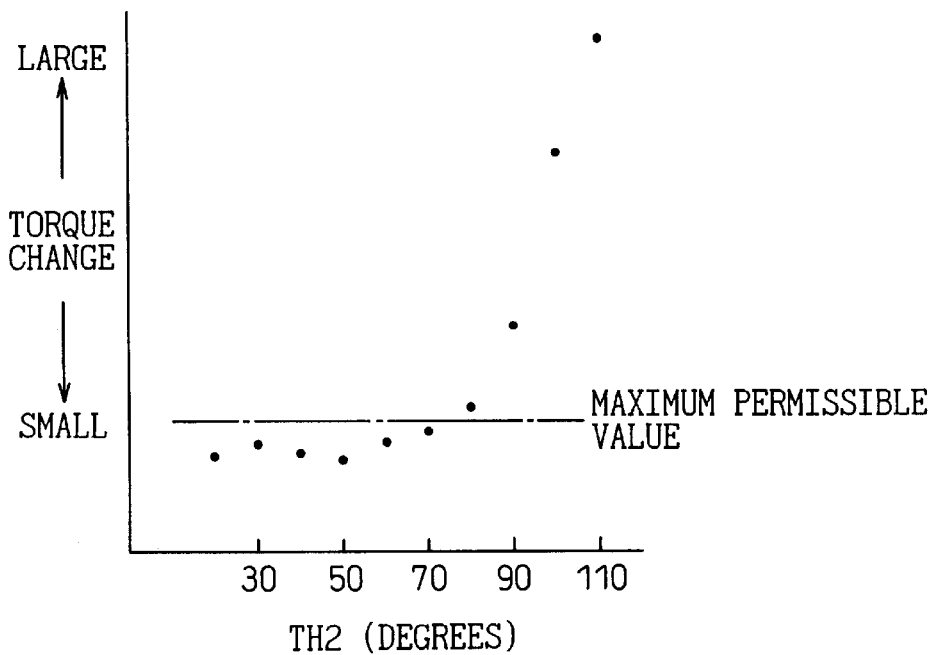
FIG. 6 is a result of experiments showing a relationship between a tip vertical angle of the deflection portion on the side wall facing the fuel injection valve and a torque change.

FIG. 6 is a result of experiments showing a relationship between a tip vertical angle (TH2) of the deflection portion (A) on the side wall 8b of the cavity 8 facing the fuel injection valve and a torque change. In the experiments, a radius (R) of the circular arc portion (B) is fixed to 10 mm, and an angle (TH1) of the deflection portion (A) with the bottom wall 8a is fixed to 65 degrees, and a length (L) of the deflection portion (A) is fixed to 4 mm. When only a tip vertical angle (TH2) is varied, a torque change is measured. As shown in FIG. 6, when a tip vertical angle (TH2) is larger than 70 degrees, a torque change becomes larger than the maximum permissible value.

This is due to the following. When the tip vertical angle (TH2) of the deflection portion (A) is large, even if each part of the fuel progressing along the deflection portion (A) has passed through the tip of the deflection portion (A), it tends to progress along the deflection portion (A). Therefore, each part of the fuel does not favorably come off the tip of the deflection portion (A) and thus it does not move into the vicinity of the spark plug 6. This phenomenon can be easily understood by imaging a case that a tip vertical angle (TH2) of the deflection portion (A) is an obtuse angle close to 180 degree. Accordingly, the angle (TH1) of the deflection portion (A) with the bottom wall 8a is set between 50 and 80 degrees, if a radius (R) of the circular arc portion (B) is set between 5 and 15 mm, if a relationship between a radius (R) of the circular arc portion (B) and a length (L) of the deflection portion (A) is "60/R>L>15/R", and if a tip vertical angle (TH2) of the deflection portion (A) is set below 70 degrees, a torque change can be kept more surely below the maximum permissible value. Here, as shown in FIG. 3, in fact, the tip of the deflection portion has a small chamfering. The chamfering makes the corner of the tip of the deflection portion an obtuse angle. If the corner of tip is an acute angle without the chamfering, the tip becomes a hot spot. The chamfering is enough small to be ignored and thus the angle (TH2) as shown in FIG. 3 can be deemed a tip vertical angle of the deflection portion (A).

In the present embodiment, the vertical radially sectional shape of the side wall of the cavity is uniform. However, this does not limit the present invention. If, in each of the vertical radially section of the side wall, the shapes of the deflection portion (A) and the circular arc portion (B) are in the above-mentioned numerical value ranges, a torque change can be maintained below the maximum permissible value.

Although the invention has been described with reference to specific embodiments thereof, it should be apparent that numerous modifications can be made thereto, by those skilled in the art, without departing from the basic concept and scope of the invention.

What is claimed is:

1. A direct fuel injection-type spark-ignition internal combustion engine comprising a cavity formed on the top surface of a piston, a spark plug facing the inside of said cavity, and a fuel injection valve for injecting fuel into said cavity in nearly the shape of a fan having a relative small thickness, wherein said cavity having a bottom wall onto which the injected fuel impinges initially and a side wall facing said fuel injection valve, said side wall having a deflection portion which is nearly the shape of a linear line and a circular arc portion which connects said deflection portion and said bottom wall smoothly in a vertical section, an angle of said deflection portion with said bottom wall being in a range from 50 to 80 degrees, a radius of said circular arc portion being in a range from 5 to 15 mm.

2. A direct fuel injection-type spark-ignition internal combustion engine according to claim 1, wherein a relationship between a length (L) of said deflection portion and a radius (R) of said circular arc portion is (60/R<L<15/R).

3. A direct fuel injection-type spark-ignition internal combustion engine according to claim 1, wherein a tip vertical angle of said deflection portion is equal to or smaller than 70 degrees.

4. A direct fuel injection-type spark-ignition internal combustion engine according to claim 2, wherein a tip vertical angle of said deflection portion is equal to or smaller than 70 degrees.

5. A direct fuel injection-type spark-ignition internal combustion engine according to claim 1, wherein said side wall has a circular arc shape in a plan view, a radius of said circular arc shape is approximately 40 mm.

6. A direct fuel injection-type spark-ignition internal combustion engine according to claim 2, wherein said side wall has a circular arc shape in a plan view, a radius of said circular arc shape is approximately 40 mm.

7. A direct fuel injection-type spark-ignition internal combustion engine according to claim 3, wherein said side wall has a circular arc shape in a plan view, a radius of said circular arc shape is approximately 40 mm.

8. A direct fuel injection-type spark-ignition internal combustion engine according to claim 4, wherein said side wall has a circular arc shape in a plan view, a radius of said circular arc shape is approximately 40 mm.

9. A direct fuel injection-type spark-ignition internal combustion engine according to claim 5, wherein a distance between the center of said circular arc shape of said side wall and the center of said spark plug in a plan view is approximately 25 mm.

10. A direct fuel injection-type spark-ignition internal combustion engine according to claim 6, wherein a distance between the center of said circular arc shape of said side wall and the center of said spark plug in a plan view is approximately 25 mm.

11. A direct fuel injection-type spark-ignition internal combustion engine according to claim 7, wherein a distance between the center of said circular arc shape of said side wall and the center of said spark plug in a plan view is approximately 25 mm.

12. A direct fuel injection-type spark-ignition internal combustion engine according to claim 8, wherein a distance between the center of said circular arc shape of said side wall and the center of said spark plug in a plan view is approximately 25 mm.

13. A direct fuel injection-type spark ignition internal combustion engine according to claim 9, wherein the center of the injection hole of said fuel injection valve, said center of said circular arc shape, and said center of said spark plug are nearly aligned in a plan view.

14. A direct fuel injection-type spark ignition internal combustion engine according to claim 10, wherein the center of the injection hole of said fuel injection valve, said center of said circular arc shape, and said center of said spark plug are nearly aligned in a plan view.

15. A direct fuel injection-type spark ignition internal combustion engine according to claim 11, wherein the center of the injection hole of said fuel injection valve, said center of said circular arc shape, and said center of said spark plug are nearly aligned in a plan view.

16. A direct fuel injection-type spark ignition internal combustion engine according to claim 12, wherein the center of the injection hole of said fuel injection valve, said center of said circular arc shape, and said center of said spark plug are nearly aligned in a plan view.

* * * * *